US008866114B2

(12) United States Patent
Shirai et al.

(10) Patent No.: US 8,866,114 B2
(45) Date of Patent: Oct. 21, 2014

(54) VISION MEASURING DEVICE

(75) Inventors: Naoki Shirai, Kure (JP); Hiroyuki Yoshida, Kure (JP)

(73) Assignee: Mitutoyo Corporation, Kawasaki (JP)

( * ) Notice: Subject to any disclaimer, the term of this patent is extended or adjusted under 35 U.S.C. 154(b) by 464 days.

(21) Appl. No.: 13/350,286

(22) Filed: Jan. 13, 2012

(65) Prior Publication Data

US 2012/0187275 A1 Jul. 26, 2012

(30) Foreign Application Priority Data

Jan. 20, 2011 (JP) ................................. 2011-009513
Jan. 27, 2011 (JP) ................................. 2011-014899

(51) Int. Cl.
*G01J 1/20* (2006.01)
*G01N 21/86* (2006.01)
*G01V 8/00* (2006.01)
*G01B 11/24* (2006.01)
*H04N 5/235* (2006.01)
*H04N 5/232* (2006.01)
*G02B 7/32* (2006.01)

(52) U.S. Cl.
CPC ............. *G01B 11/24* (2013.01); *H04N 5/2354* (2013.01); *H04N 5/23212* (2013.01); *H04N 5/2353* (2013.01); *G02B 7/32* (2013.01); *H04N 5/2352* (2013.01)
USPC ...................................... 250/559.29; 382/103

(58) Field of Classification Search
USPC ............................ 250/559.29, 201.4; 382/103
See application file for complete search history.

(56) References Cited

U.S. PATENT DOCUMENTS

| 6,268,918 | B1 | 7/2001 | Tanabe et al. |
| 2001/0019361 | A1* | 9/2001 | Savoye ........................ 348/222 |
| 2004/0016814 | A1* | 1/2004 | Muramatsu .............. 235/462.41 |
| 2004/0246367 | A1 | 12/2004 | Yoshida |
| 2007/0177860 | A1 | 8/2007 | Hooley et al. |
| 2008/0062297 | A1* | 3/2008 | Sako et al. ............... 348/333.02 |
| 2010/0157136 | A1* | 6/2010 | Li et al. ......................... 348/349 |
| 2010/0171875 | A1 | 7/2010 | Yamamoto |

FOREIGN PATENT DOCUMENTS

| EP | 1 486 758 A2 | 12/2004 |
| JP | A-2007-6343 | 1/2007 |
| JP | A-2008-197144 | 8/2008 |
| JP | A-2008-224808 | 9/2008 |
| JP | A-2009-168607 | 7/2009 |
| WO | WO 2010/131444 A1 | 11/2010 |

OTHER PUBLICATIONS

Extended European Search Report issued in European Patent Application No. 13160574.3 on May 29, 2013.

(Continued)

*Primary Examiner* — Seung C Sohn
(74) *Attorney, Agent, or Firm* — Oliff PLC

(57) ABSTRACT

A vision measuring device includes: an imaging device which images a workpiece; an illumination device which irradiates the workpiece with light; a position control system which controls an in-focus position of the imaging device and outputs the in-focus position as information representing a position in an in-focus axis direction; and a control device which, when the position control system controls the in-focus position, controls the frame rate of the imaging device, and controls at least one of the imaging device and the illumination device such that an amount of light to be received by the imaging device becomes substantially constant.

20 Claims, 9 Drawing Sheets

(56) References Cited

OTHER PUBLICATIONS

Extended European Search Report issued in European Patent Application No. 13160577.6 on May 29, 2013.

European Office Action issued in European Patent Application No. 12 151 395.6 dated Jul. 4, 2013.

Apr. 25, 2012 Partial European Search Report issued in Patent Application No. 12151395.6.

* cited by examiner

VISION MEASURING DEVICE

CROSS REFERENCE TO RELATED APPLICATIONS

This application is based on and claims the benefit of priority from prior Japanese Patent Application No. 2011-9513, filed on Jan. 20, 2011, and from prior Japanese Patent Application No. 2011-14899, filed on Jan. 27, 2011, the entire contents of which are incorporated herein by reference.

BACKGROUND OF THE INVENTION

1. Field of the Invention

The present invention relates to a vision measuring device which measures a measuring target by imaging the measuring target.

2. Description of the Related Art

A vision measuring device having an auto-focusing function sequentially acquires images of a measuring target by moving an imaging device such as a camera or its optical system in the light axis direction, and defines the position in the light axis direction at which an image with the highest contrast is acquired as the in-focus position for the measuring target (JP2009-168607A).

The auto-focusing accuracy and speed of such a vision measuring device having a contrast-type auto-focusing function are more or less influenced by the frame rate, etc. in the auto-focusing operation.

For example, such a vision measuring device might acquire images with uneven brightness due to flickers which might be caused depending on the combination of the frame rate of the imaging device and the emission frequency of an illumination unit that illuminates the imaging range. In this case, the contrast of an image with poor brightness becomes low regardless of whether the image is acquired at an in-focus position or not because such an image has a small brightness difference between the pixels, whereas the contrast of an image with affluent brightness becomes high. Hence, there is a problem that it is difficult to judge the in-focus position based on the contrast, which reduces the reliability of auto-focusing.

In order to overcome this problem, a vision measuring device commonly has an illumination unit that does not cause flickers depending on its combination with the imaging device. However, also in this case, there may be many occasions when it is difficult to eliminate the influence of external diffused light depending on the configuration of the vision measuring device. A fluorescent tube (hereinafter, referred to as interior lamp) is an example of external diffused light that is difficult to eliminate and tends to be problematic. An interior lamp repeats blinking at 100 Hz in a district where the power source frequency is 50 Hz and at 120 Hz in a district where the power source frequency is 60 Hz, and gives an adverse effect to a measurement result and an auto-focusing result. There is also a case when an illumination unit itself flickers.

Moreover, although such a vision measuring device can be easily realized by a camera and software, there is a problem that the device takes a long time for the auto-focusing process. In order to solve this problem, it is conceivable to move the camera and the optical system at a high speed. However, this makes the image acquiring pitch during auto-focusing rough because the frame rate is constant, and makes it difficult to obtain a correct in-focus position.

SUMMARY OF THE INVENTION

The present invention was made in view of these matters, and an object of the present invention is to provide a vision measuring device capable of an auto-focusing process that is highly accurate and high-speed.

A vision measuring device according to one embodiment of the present invention includes: an imaging device which images a workpiece; an illumination device which irradiates the workpiece with light; a position control system which controls an in-focus position of the imaging device and outputs the in-focus position as information representing a position in an in-focus axis direction; and a control device which, when the position control system controls the in-focus position, controls a frame rate of the imaging device, and also controls at least one of the imaging device and the illumination device such that an amount of light to be received by the imaging device becomes substantially constant.

In a vision measuring device according to another embodiment of the present invention, the control device may control at least one of the imaging device and the illumination device in response to a signal from the imaging device.

A vision measuring device according to another embodiment of the present invention includes: an imaging device which imaging a workpiece, and of which exposure time is variable; an illumination device which is controlled to emit light at a certain emission frequency and irradiate the workpiece with illumination light; a position control system which controls an in-focus position of the imaging device and outputs the in-focus position as information representing a position in an in-focus axis direction; and a control device which, when the position control system controls the in-focus position, sets the exposure time of the imaging device to an integral multiple of a lighting period of an interior lamp based on which of a first frequency and a second frequency a lighting frequency of the interior lamp is, wherein the emission frequency of the illumination device is set to a common multiple of the first frequency and the second frequency.

Such a configuration enables a highly accurate auto-focusing process by eliminating the influence of external diffused light that repeats blinking at a certain period and acquiring images with even brightness. Furthermore, such a configuration can be used commonly in districts with different power source frequencies.

In a vision measuring device according to another embodiment of the present invention, the control device may detect the lighting frequency of the interior lamp when the illumination device is turned off.

In a vision measuring device according to another embodiment of the present invention, the control device may control the position control system both in a case when the exposure time of the imaging device is set to an integral multiple of a lighting period corresponding to the first frequency and a case when the exposure time of the imaging device is set to an integral multiple of a lighting period corresponding to the second frequency, such that the imaging device performs imaging at a plurality of different in-focus positions corresponding to these cases, may calculate a fluctuation rate of average brightness of acquired images, and may set the exposure time of the imaging device to an integral multiple of the lighting period corresponding to either the first frequency or the second frequency that corresponds to a lower fluctuation rate of average brightness.

Such a configuration makes it possible to set the frame rate of the imaging device and the emission frequency of the illumination device without requiring a complicated operation, enabling a highly accurate auto-focusing process to be performed easily in any district.

In a vision measuring device according to another embodiment of the present invention, the first frequency may be 100 Hz, and the second frequency may be 120 Hz.

In a vision measuring device according to another embodiment of the present invention, the emission frequency of the illumination device may be an integral multiple of 600 Hz.

In a vision measuring device according to another embodiment of the present invention, the control device may change the in-focus position of the imaging device after three or more images of the workpiece are acquired.

In a vision measuring device according to another embodiment of the present invention, the illumination device may receive a vertical synchronization signal from the imaging device, and output a certain number of pulses within the exposure time of the imaging device.

In a vision measuring device according to another embodiment of the present invention, the control device may set a long exposure time when the workpiece is irradiated with external diffused light other than the interior lamp.

A vision measuring device according to another embodiment of the present invention includes: an imaging device which images a workpiece, and of which frame rate is variable; an illumination device which irradiates the workplace with light; a position control system which controls an in-focus position of the imaging device and outputs the in-focus position as information representing a position in an in-focus axis direction; and a control device which, when the position control system controls the in-focus position, controls the frame rate of the imaging device and adjusts a light volume of the illumination device in accordance with the frame rate of the imaging device.

In a vision measuring device according to another embodiment of the present invention, when controlling the in-focus position of the imaging device, the control device may receive a portion of an image of an imaging range of the imaging device, increase the frame rate of the imaging device, and increase the light volume of the illumination device.

In a vision measuring device according to another embodiment of the present invention, the control device may adjust the light volume of the illumination device in response to a vertical synchronization signal output by the imaging device.

In a vision measuring device according to another embodiment of the present invention, when controlling the in-focus position of the imaging device, the control device may adjust the light volume of the illumination device in accordance with a first frame rate calculated from an interval of the vertical synchronization signal output by the imaging device and a second frame rate used in a normal measurement.

In a vision measuring device according to another embodiment of the present invention, the control device may adjust a gain of the imaging device in accordance with the frame rate of the imaging device.

In a vision measuring device according to another embodiment of the present invention, the control device may obtain the in-focus position in response to the vertical synchronization signal.

In a vision measuring device according to another embodiment of the present invention, the control device may adjust the light volume of the illumination device by using illuminance defined by a color, a reflectivity, etc. of a surface of the workpiece.

A vision measuring device according to another embodiment of the present invention may further include: a frame rate detecting device which detects the frame rate of the imaging device; and a standard frame rate retaining unit which retains the frame rate of the imaging device during vision measurement.

In a vision measuring device according to another embodiment of the present invention, the frame rate detecting device and the frame rate retaining unit may be implemented by a program.

In a vision measuring device according to another embodiment of the present invention, the control device may adjust the gain of the imaging device when an output of the illumination device exceeds a certain value.

DETAILED DESCRIPTION OF THE EMBODIMENTS

First Embodiment

Next, the configuration of a vision measuring device according to the first embodiment of the present invention will be explained in detail with reference to the drawings.

Figure 1:
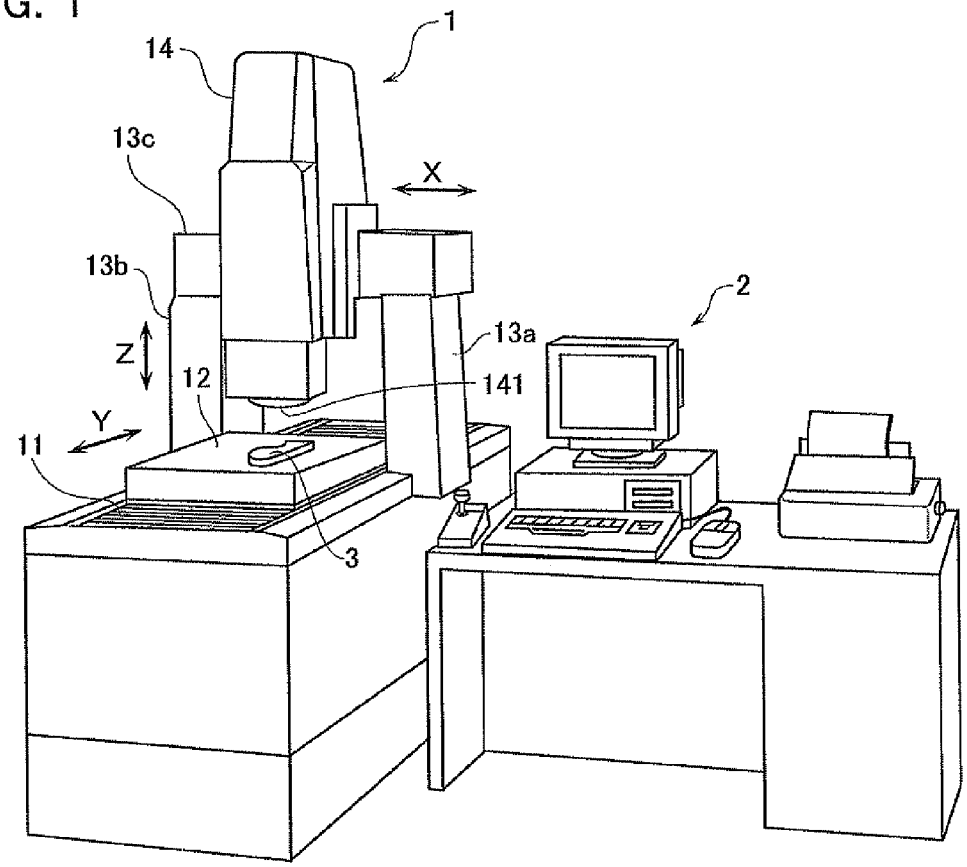
FIG. 1 is a diagram of the whole appearance of a vision measuring device according to the first embodiment of the present invention.

FIG. 1 is a diagram of the whole appearance of the vision measuring device according to the present embodiment. The vision measuring device includes a vision measuring machine 1 mounted with a camera 141 as an imaging device for imaging a workpiece 3, and a computer (hereinafter referred to as "PC") 2 electrically connected to the vision measuring machine 1.

The vision measuring machine 1 is configured as follows. Namely, a sample holder 12 is placed on a sample moving unit 11 such that the top surface of the sample holder 12, which is a base surface, becomes a horizontal plane. An X-axis guide 13c is supported on the top ends of arm supports 13a and 13b that stand on both side ends of the sample moving means 11. The sample holder 12 is driven in a Y-axis direction by the sample moving means 11. An imaging unit 14 is supported on the X-axis guide 13c such that it can be driven in the X-axis direction. A camera 141 is mounted on the lower end of the imaging unit 14.

Though the present embodiment employs a manner of imaging the workpiece 3 that is positioned on the sample holder 12, needless to say, it may employ any other manner, and for example, may employ a manner of imaging a workpiece placed on the floor from a lateral side. The camera 141 may be a camera of various types such as a CCD, a CMOS, etc.

Figure 2:
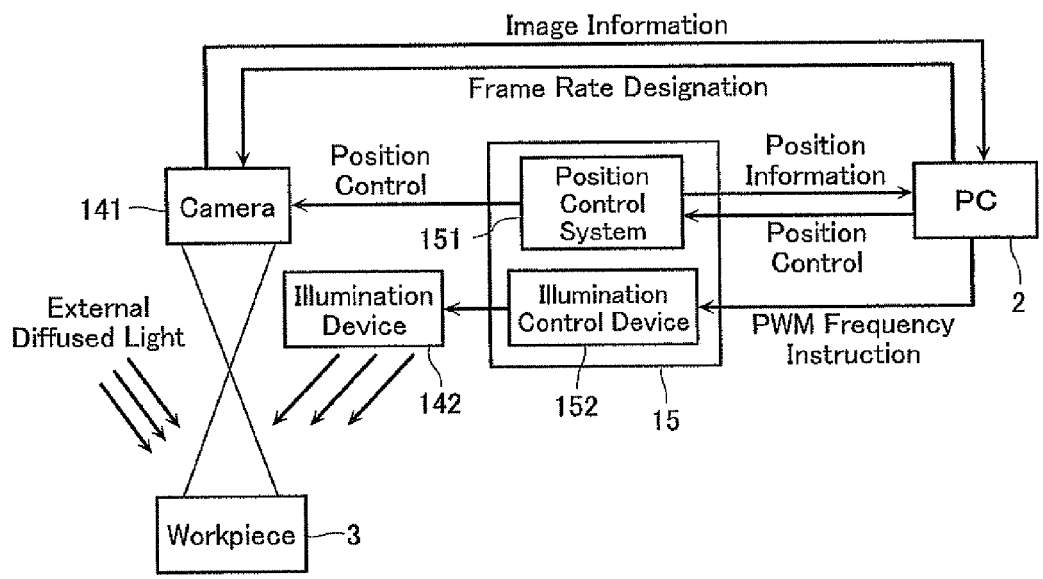
FIG. 2 is a block diagram showing the configuration of the same vision measuring device.

FIG. 2 is a block diagram of the vision measuring device according to the present embodiment. In the present embodiment, the vision measuring device includes a controller 15 as a control device inside, for example, the vision measuring machine 1, and the controller 15 includes a position control system 151 and an illumination control device 152. The imaging unit 14 includes an illumination device 142 which irradiates the workpiece 3 with light. In the present embodiment, the illumination device 142 is a PWM (Pulse Width Modulation)-controlled LED. The PC 2 controls the in-focus position of the camera 141 through the position control system 151. The PC 2 sends a signal designating a frame rate to the camera 141, and sends a PWM frequency instruction for the illumination device 142 to the illumination control device 152. The camera 141 images the workpiece 3 irradiated with the illumination light from the illumination device 142 and interior light at the designated frame rate, and sends image information to the PC 2. At this time, position information of the camera 141 is sent from the position control system 151 to PC 2. In the present embodiment, a PWM-controlled LED illuminator is used as the illumination device 142, but needless to say, an illuminator of various types may be used.

Figure 3:
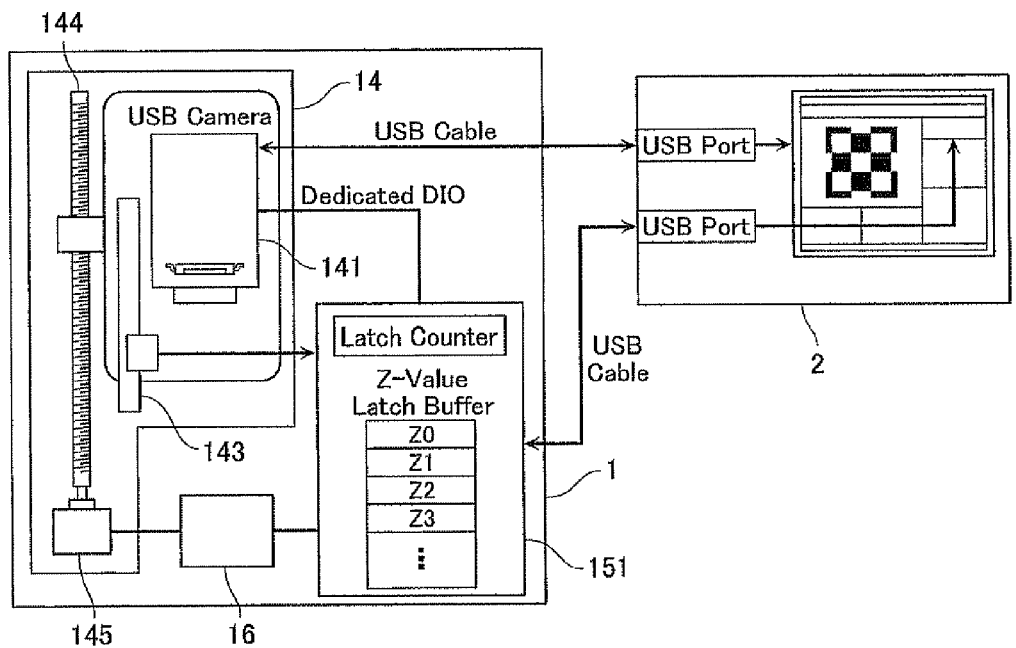
FIG. 3 is a block diagram showing some components of the same vision measuring device.

Next, the configuration of the imaging unit 14 of the vision measuring device according to the present embodiment will be explained. FIG. 3 is a block diagram showing the configuration of some portions of the vision measuring device according to the present embodiment. In the present embodiment, the imaging unit 14 includes a camera 141, a linear encoder 143 which detects and outputs the Z-coordinate of the camera 141, a camera driving mechanism 144 which drives the camera 141 in the Z-axis direction, and a z-axis motor 145 which drives the camera driving mechanism 144. The Z-axis motor 145 is controlled by the position control system 151 through a power unit 16 provided in the vision measuring machine 1. The linear encoder 143 is mounted so as to let its scale or detecting head move in the Z-axis direction in conjunction with the camera 141. The position control system 151 includes a latch counter and a Z-value latch buffer, acquires Z-coordinate information of the camera 141 from the linear encoder 143 in response to a trigger signal, and retains the acquired information in the Z-value latch buffer. The camera 141 is connected to the PC 2 through a USB interface and to the position control system 151 through a dedicated DIO (Digital Input/Output) respectively.

The position control system 151 outputs a Z-axis drive instruction to the power unit 16. The power unit 16 feeds a driving power to the Z-axis motor 145, and the Z-axis motor 145 drives the camera 141 by means of the camera driving mechanism 144. The camera 141 performs imaging at an arbitrary frame rate, and sends image information to the PC 2 through the USB interface. At this time, the camera 141 may output a vertical synchronization signal to the position control system 151 as a trigger signal. In this case, the position control system 151 receives the vertical synchronization signal, and in response to this, acquires the Z-coordinate of the camera 141 from the linear encoder 143. The acquired Z-coordinate is retained in the Z-value latch buffer, and the latch counter is updated. The retained Z-value is sent to the PC 2 in response to a readout instruction. In the present embodiment, the camera 141 is driven in the Z-axis direction, but a similar operation is available also by adjusting the optical system provided in the camera 141 such as a lens, etc. In the present embodiment, a USB interface is used as a digital serial communication means, but needless to say, any other means such as Gig-E, FireWire, etc. may also be used.

Figure 4:
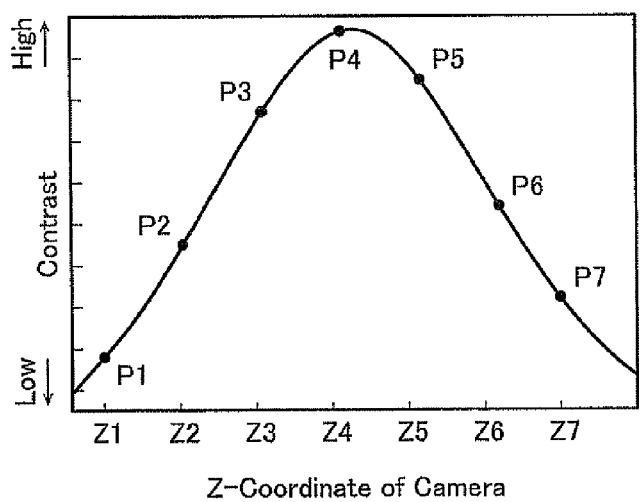
FIG. 4 is a diagram showing an auto-focusing method of the same vision measuring device.

Next, an auto-focusing method of the vision measuring device according to the present embodiment will be explained. FIG. 4 is a diagram for explaining the auto-focusing method of the vision measuring device according to the present embodiment, wherein the horizontal axis represents the Z-coordinate of the camera 141 and the vertical axis represents contrast respectively.

In the auto-focusing by the vision measuring device according to the present embodiment, imaging is performed at a plurality of Z-coordinates, contrasts are calculated from the images acquired at the respective coordinate positions, and the Z-coordinate at which an image with the highest value among the plurality of calculated contrasts is acquired is judged as the in-focus position. In the example of FIG. 4, imaging is performed at seven Z-coordinates (Z1 to Z7), and contrasts (P1 to P7) at the respective Z-coordinates are calculated. In the example of FIG. 4, since the contrast P4 at the Z-coordinate Z4 is the highest, the Z-coordinate Z4 is judged as the in-focus position, and the Z-coordinate of the camera 141 is set to the Z-coordinate Z4.

Next, the problems of the conventional contrast-type auto-focusing will be explained. As described above, as regards such a vision measuring device, there is a case when the workplace 3 is irradiated not only by the light from the illumination device 142 but also by external diffused light. In many cases, such a vision measuring device is used indoors, and the external diffused light is light from an interior lamp. The interior lamp repeats blinking at a constant period, and might generate a flicker in the images to be acquired depending on the relationship between the blinking period and the frame rate of the camera 141.

Figure 5:
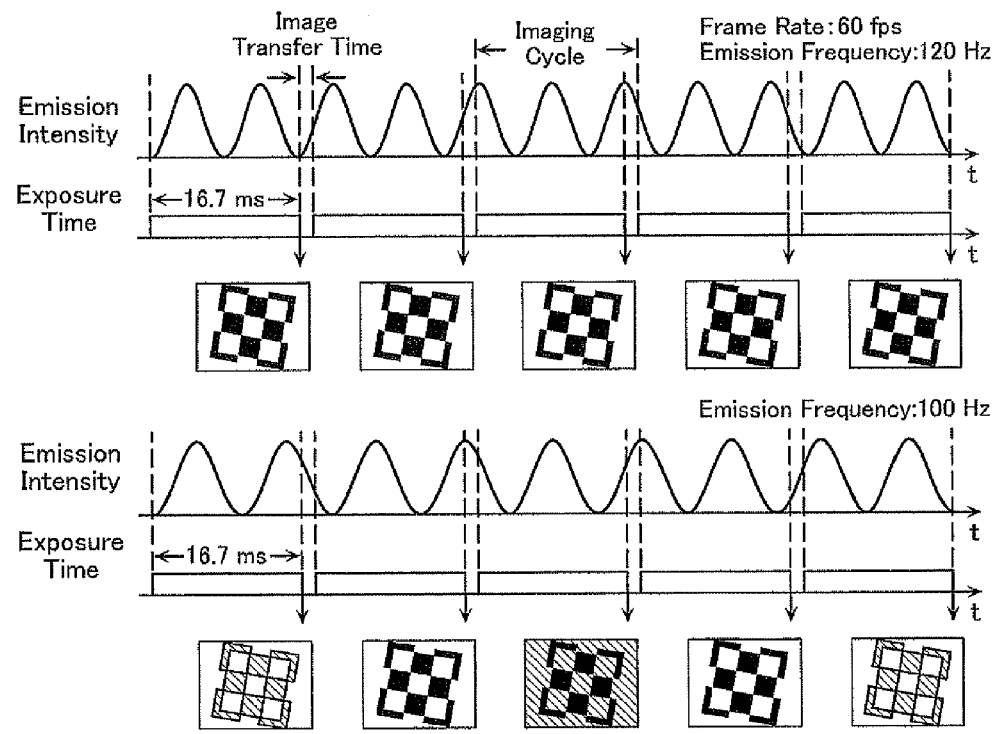
FIG. 5 is, a timing chart showing the relationship between the lighting frequency of an interior lamp and the exposure time, regarding the vision measuring device.

The problem of the flicker will be explained with reference to FIG. 5 to FIG. 8. Generally, the lighting frequency of a fluorescent tube (hereinafter, interior lamp) of other than an inverter-type is dependent on the power source frequency, and is 100 Hz in a district where the power source frequency is 50 Hz and 120 Hz in a district where the power source frequency is 60 Hz. FIG. 5 shows a relationship between the lighting frequency of the interior lamp and the frame rate of the camera 141 when imaging is performed at the frame rate of 60 fps. The upper row shows the case of the power source frequency being 60 Hz, and the lower row shows the case of the power source frequency being 50 Hz.

As shown in the upper row of FIG. 5, the camera 141 receives light during 1/60 s (approximately 16.7 msec) from when it starts exposure, and transfers an image to the PC 2 when the light reception ends. The camera 141 starts exposure again when it finishes the image transfer to the PC2, and subsequently repeats the same operation. In FIG. 5, a relatively long time is set for the image transfer time. Here, an example is shown where the frame period (=the reciprocal of the frame rate) is set substantially equal to the exposure time, and gradual disagreement between the phase of the frame rate and that of the lighting frequency due to an error between them is shown emphatically.

As described above, when the power source frequency is 60 Hz, the lighting frequency of an interior lamp is 120 Hz. Accordingly, when the exposure time is set to 1/60=16.7 ms, the amount of light to be received by the camera 141 from the start of the light reception till the end thereof corresponds to two periods of the interior lamp. Hence, even if the lighting period of the interior lamp and the frame period go disagreeing, the images to be picked up by the camera 141 will all have the same brightness.

As compared with this, when the power source frequency is 50 Hz, i.e., when the lighting frequency of the interior lamp is 100 Hz, the interior lamp repeats blinking at a period of 10 msec. Therefore, as shown in the lower row of FIG. 5, the exposure time of the camera 141 is not an integral multiple of the lighting period of the interior lamp. Hence, the amount of light to be received by the camera 141 is different from one imaging shot to another, and a flicker is generated in the acquired images.

As described above, the contrast-type auto-focusing calculates a contrast from an image acquired by the camera 141. Hence, when a flicker is generated in an image acquired by the camera 141, it is difficult to calculate the contrast correctly.

Figure 6:
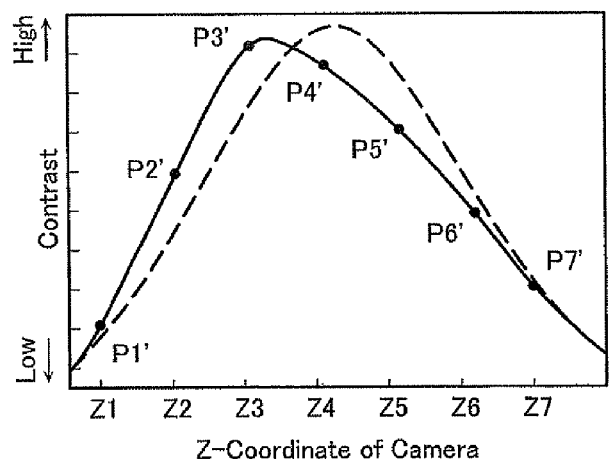
FIG. 6 is a diagram showing the relationship between contrast and Z-coordinate of a camera, regarding the vision measuring device.

FIG. 6 is a diagram in which the contrasts which are supposed to be obtained if no flicker occurs are compared with the contrasts with errors due to the flicker, wherein the vertical axis represents the contrast, and the horizontal axis represents the Z-coordinate of the camera. The curve indicated by a dashed line represents the contrasts supposed to be obtained, and the curve indicated by a solid line represents the contrasts with errors. As shown in FIG. 6, due to the flicker generated in the acquired images, the contrast peak shifts to a position that is different from the supposed-to-be position. As a result, the contrast P3' becomes higher than the contrast P4', and the coordinate Z3 is judged as the in-focus position instead of the coordinate Z4 that is supposed to be the in-focus position.

Figure 7:
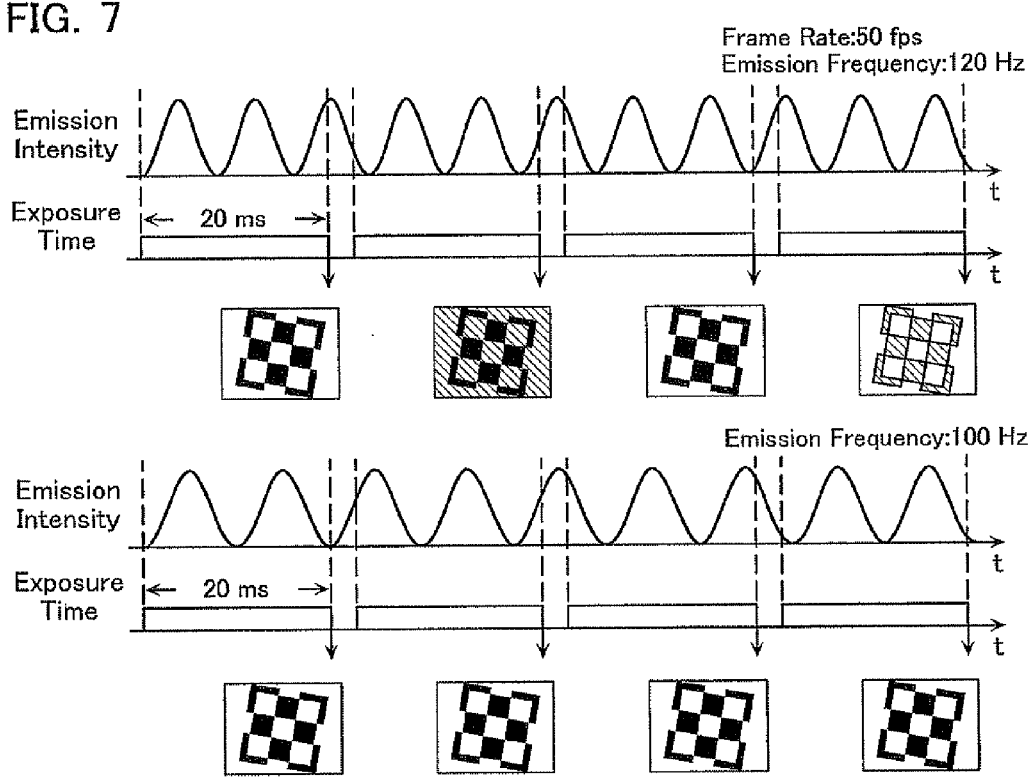
FIG. 7 is a timing chart showing the relationship between the lighting frequency of an interior lamp and the exposure time, regarding the vision measuring device.

FIG. 7 shows a diagram that is basically the same as FIG. 5. However, the difference is that the frame rate is set to 50 fps in FIG. 7 whereas it is set to 60 fps in FIG. 5. In this case, contrary to the case of FIG. 5, no flicker occurs among the images acquired by the camera 141 when the lighting frequency of the interior lamp is 100 Hz, whereas a flicker occurs when the lighting frequency of the interior lamp is 120 Hz.

Figure 8:
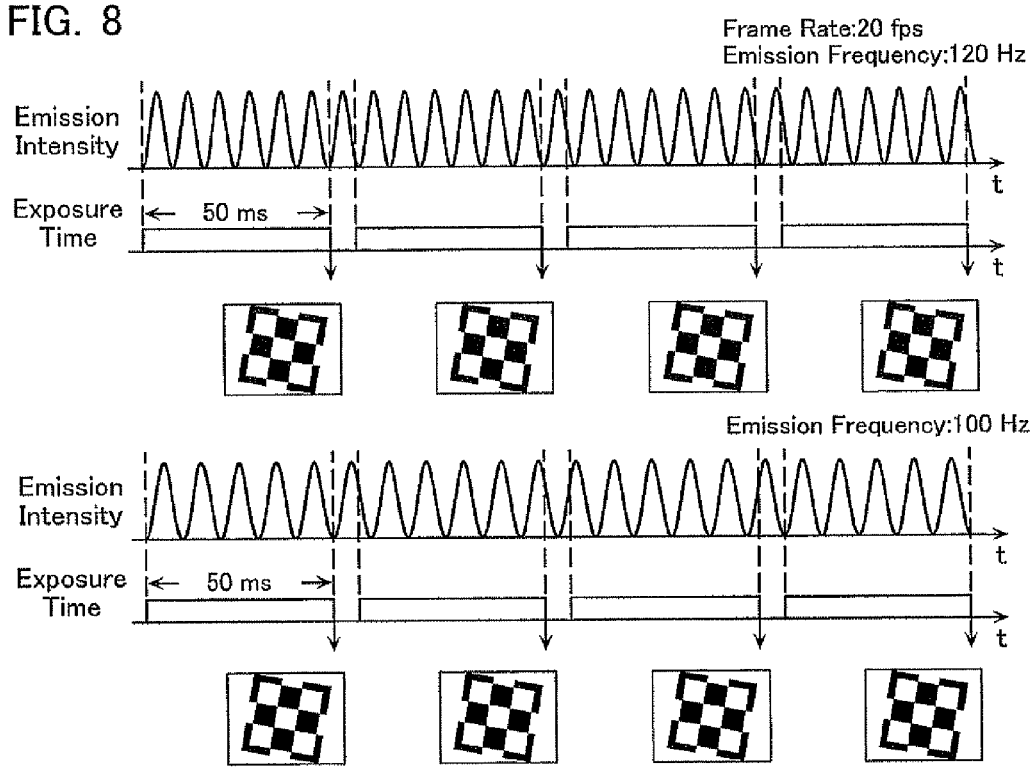
FIG. 8 is a timing chart showing the relationship between the lighting frequency of an interior lamp and the exposure time, regarding the vision measuring device.

FIG. 8 also shows a diagram that is basically the same as FIG. 5 and FIG. 7, but the frame rate of the camera is set to 20 fps in FIG. 8. In this case, both when the lighting frequency of the interior lamp is 100 Hz and when it is 120 Hz, the exposure time of 50 ms is an integral multiple of the lighting period of the interior lamp. Therefore, no flicker will occur. However, if imaging is performed at this frame rate, the imaging speed will greatly drop and auto-focusing will take an enormous time.

Figure 9:
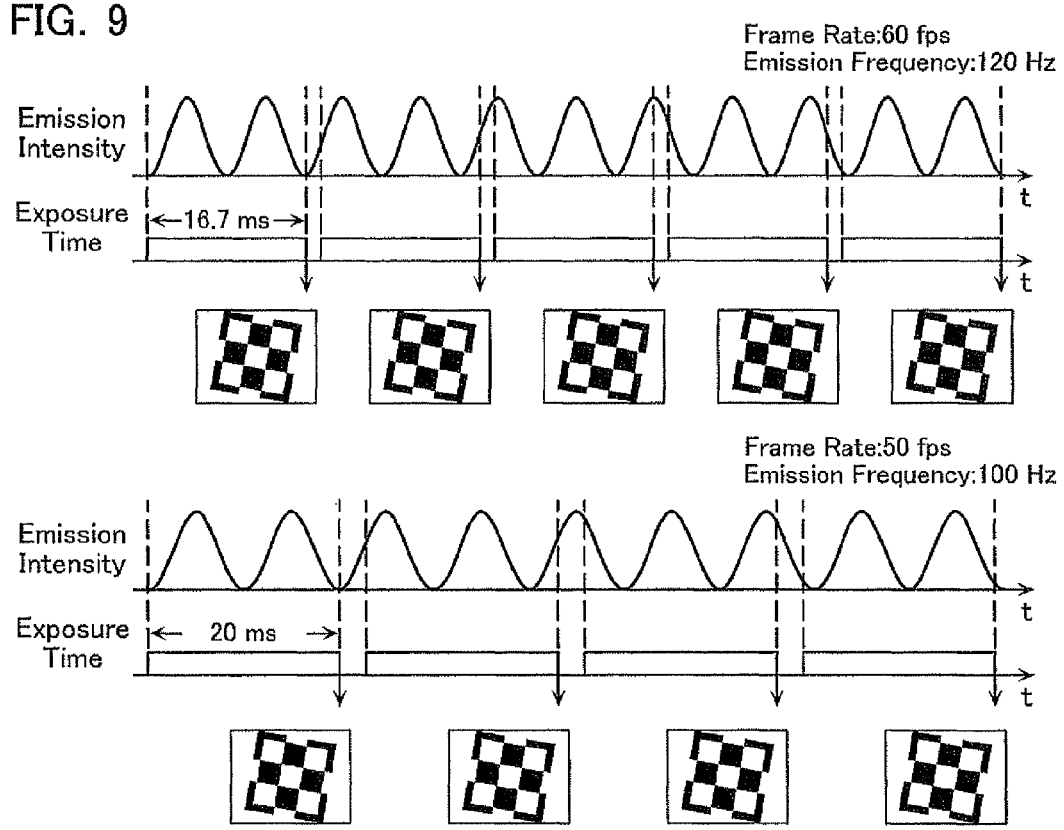
FIG. 9 is a timing chart showing an example of the relationship between the lighting frequency of an interior lamp and the exposure time, regarding the vision measuring device according to an embodiment of the present invention.

To solve this problem, the present invention employs adjusting the exposure time of the camera 141 according to the lighting frequency of the interior lamp. This adjusting method is shown in FIG. 9. FIG. 9 is basically the same as FIG. 5, but different in that the exposure time of the camera is set to 1/60 s when the power source frequency is 60 Hz while it is set to 1/50 s when the power source frequency is 50 Hz. By adjusting the exposure time flexibly according to the power source frequency, it is possible to acquire images with no flicker due to external diffused light. Note that although in FIG. 9, the exposure time of the camera is twice as long as the time of one period of the lighting frequency of the interior lamp, it needs not be twice as long but needs only to be an integral multiple. Practically, it is conceivable to achieve a high auto-focusing speed by setting a short exposure time, i.e., by setting a high frame rate. Specifically, it is conceivable to set the exposure time of the camera to 1/120 s when the power source frequency is 60 Hz, and set the exposure time of the camera to 1/100 s when the power source frequency is 50 Hz. When the workpiece 3 is irradiated by external diffused light other than the interior lamp, it is conceivable to set a long exposure time, i.e., set a low frame rate to thereby suppress noises and improve the reliability of the auto-focusing operation. In the present embodiment, the exposure time of the camera 141 needs only to be set to an integral multiple of the lighting period of the interior lamp, and is irrelevant to the frame rate. The exposure time set in this way ensures that a constant amount of light is always received during exposure even if the timing at which exposure starts within a frame, period is inconstant, and hence prevents a flicker.

Next, a method of automatically detecting the lighting frequency of the interior lamp by using software will be explained.

Figure 10:
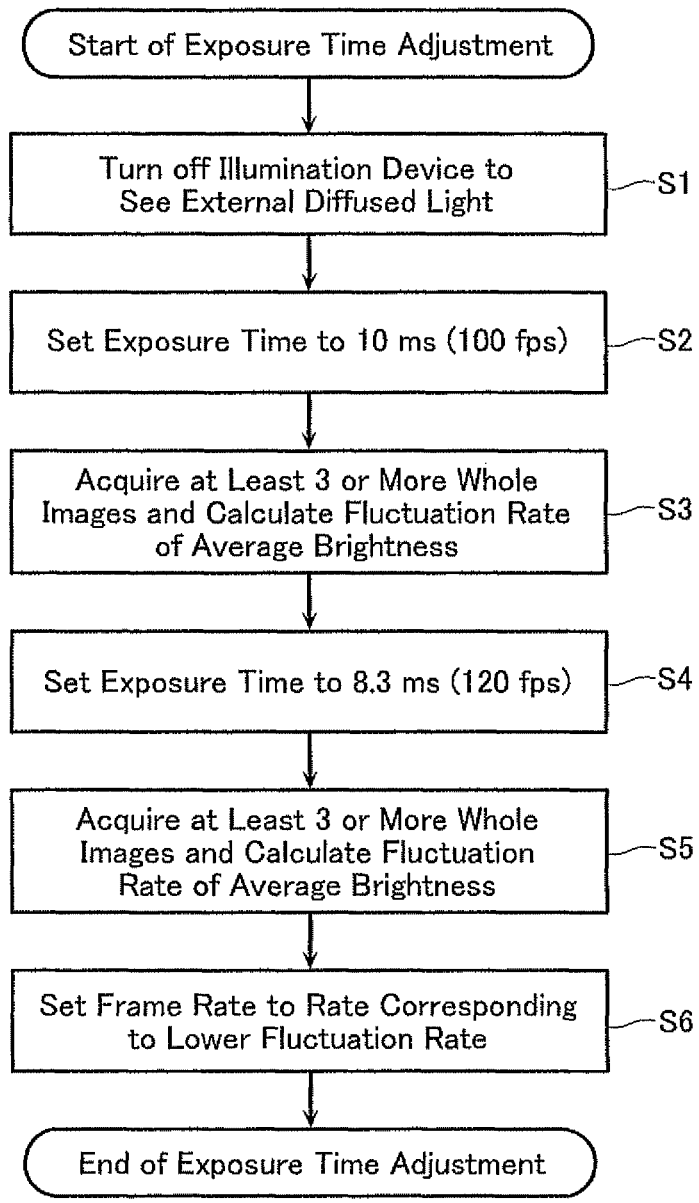
FIG. 10 is a flowchart showing a frame rate determining method of the vision measuring device according to the first embodiment of the present invention.

FIG. 10 shows the flow of a process for detecting the lighting period of the interior lamp. FIG. 10 is a flowchart of a frame rate adjusting method for setting the frame rate of the camera to 120 fps when the power source frequency described above is 60 Hz and to 100 fps when the power source frequency is 50 Hz, which is implemented by software. When frame rate adjustment is started, the PC 2 first turns off the illumination device 142 to see the influence of external diffused light (S1). Next, the frame rate of the camera 141 is set to 100 fps (S2). Then, imaging by the camera 141 is performed to acquire images of the workpiece 3, and the fluctuation rate of the average brightness is calculated (S3). In this step S3, it is preferable to acquire three or more images of the workpiece 3. Next, the frame rate of the camera 141 is changed to 120 fps (S4). Images of the workpiece 3 are acquired and the fluctuation rate of the average brightness is calculated (S5). Finally, the fluctuation rate of the average brightness when the frame rate of the camera 141 is set to 100 fps is compared with the fluctuation rate of the average brightness when the frame rate of the camera 141 is set to 120 fps, and the frame rate of the camera 141 is set to the frame rate corresponding to the lower one of the fluctuation rates of the average brightness (S6). The frame rate of the camera 141 may be first set to 60 fps and then changed to 50 fps. In step S6, when both of the fluctuation rates of the average brightness compared are equal to or higher than a certain threshold, the frame rate may be set to 60 fps. When both of the calculated fluctuation rates of the average brightness are low, the frame rate may be set manually. Such a method as described above may be executed when the vision measuring device or the dedicated software is started.

Next, the operation of the illumination device 142 of the vision measuring device according to the present embodiment will be explained. In the embodiment, a PWM-controlled LED is used as the illumination device 142, and the PWM frequency is set to an integral multiple of 600 Hz which is the least common multiple of 120 and 100. The reason of this will be explained below.

Figure 11:
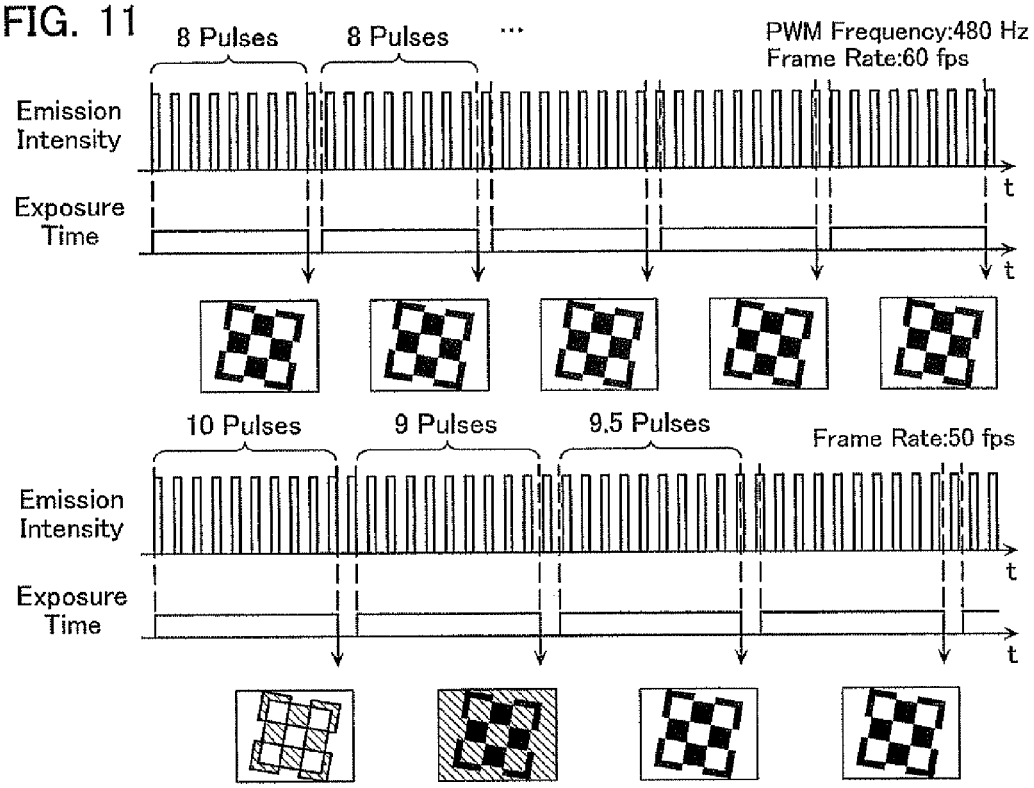
FIG. 11 is a timing chart showing the relationship between the emission frequency and the exposure time, regarding the vision measuring device.

FIG. 11 is a timing chart showing the relationship between the emission time of the illumination device 142 and the exposure time of the camera 141 when the PWM frequency is set to 480 Hz. The upper row shows the case when the frame rate of the camera 141 is 60 fps, and the lower row shows the case when the frame rate of the camera 141 is 50 fps.

When the PWM frequency is 480 Hz and the frame rate of the camera 141 is 60 fps as shown in the upper row of FIG. 11, the PWM frequency is eight times as large as the frame rate. Hence, the camera 141 receives an amount of light corresponding to eight pulses from the illumination device 142, and the acquired images all have the same amount of light. As compared with this, when the frame rate of the camera 141 is 50 fps as shown in the lower row of FIG. 11, the PWM frequency of the camera is 9.6 times as large as the frame rate of the camera. Hence, the PWM frequency of the illumination device 142 is not an integral multiple of the frame rate. As a result, like the example of the lower row of FIG. 5, an error is generated between the frame rate of the camera 141 and the irradiation cycle of the illumination device 142, and hence a flicker is generated between the images acquired. In such a case, like as explained with reference to FIG. 5 and FIG. 6, an error is generated between the contrasts acquired and the contrasts supposed to be acquired, and the auto-focusing accuracy is damaged.

Figure 12:
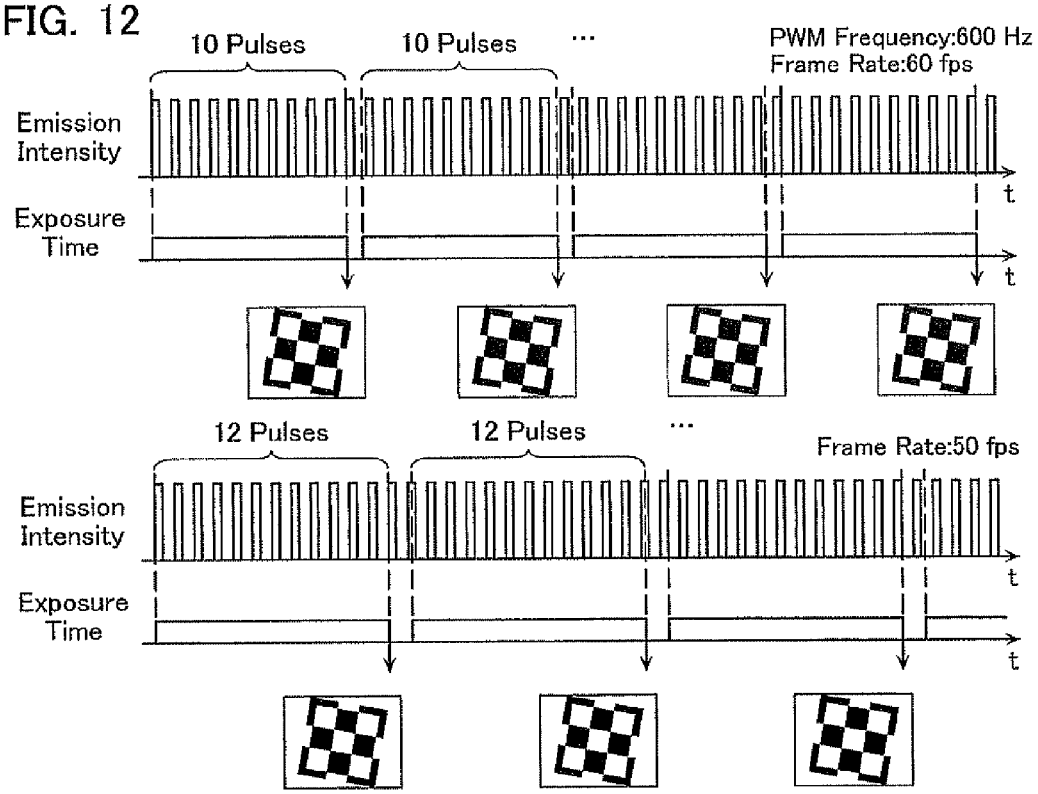
FIG. 12 is a timing chart showing the relationship between the emission frequency and the exposure time, regarding the vision measuring device according to the first embodiment of the present invention.

As compared with this, the vision measuring device according to the present embodiment sets the emission frequency of the illumination device 142 to a multiple of 600 Hz. FIG. 12 shows what it is like when the emission frequency of the illumination device 142 is set to a multiple of 600 Hz. FIG. 12 is basically the same as FIG. 11 but different in that the emission frequency of the illumination device 142 is set to 600 Hz. As can be seen from the upper row of FIG. 12, when the frame rate of the camera 141 is 60 fps, the amount of light by which the workpiece 3 is irradiated by the illumination device 142 during one exposure time of the camera 141 is an amount corresponding to ten pulses of the illumination device 142. When the frame rate of the camera 142 is 50 fps, an amount of light received corresponds to twelve pulses of the illumination device 142. Hence, both when the frame rate of the camera 141 is set to 50 fps and when it is set to 60 fps, the amount of light to be received is always constant.

With such a configuration, it becomes possible to acquire appropriate images with no flicker even when the frame rate of the camera 141 changes. When the illumination is turned on by a switching-type power circuit, ripples occur due to the switching, in principle. The illumination also flickers due to the ripples, and a flicker might be generated in the input images. However, this problem can be overcome by the configuration of the present embodiment.

Since the frame rate of the camera is selected from between 100 fps and 120 fps in the present embodiment, the emission frequency of the illumination device 142 is set to 600 Hz. However, it is only necessary that the emission frequency be a common multiple of the plurality of frame rates to select from. For example, when selecting the frame rate of the camera from between 50 fps and 60 fps, it is possible to set the emission frequency to 300 Hz which is the least common multiple of these frame rates. When setting the frame rate of the camera 141 to any other values than 50 fps and 60 fps, it is possible to adjust the emission frequency of the illumination device 142 automatically to an integral multiple of the frame rates of the camera 141. Moreover, it is also possible to make the illumination device 142 receive a vertical synchronization signal from the camera 141 and emit light by only a fixed number of pulses within the exposure time.

Furthermore, for example, when controlling a minute current or voltage by a switching-type power circuit, there is a method for, by thinning the switching, improving the efficiency or making it seem like a more minute current or voltage than can be controlled by the actual ability of the switching control element is controlled. Also in such a case, setting a constant thinning period and setting the thinning frequency to a common multiple of the frame rates makes it possible to ensure that no flicker is generated in the input images.

Second Embodiment

Next, the configuration of the vision measuring device according to the second embodiment of the present invention will be explained in detail with reference to the drawings.

Figure 13:
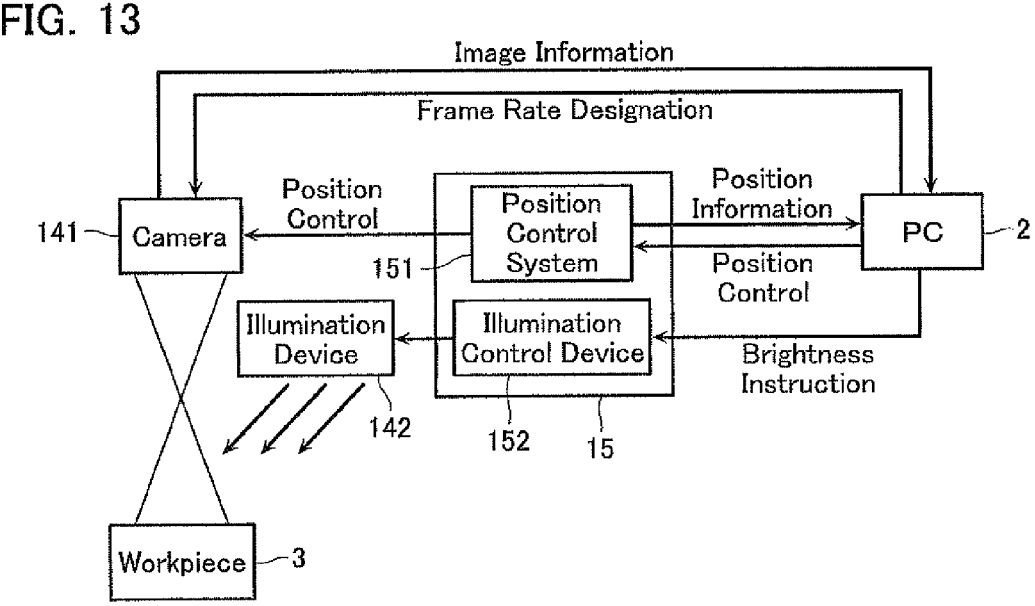
FIG. 13 is a block diagram showing the configuration of a vision measuring device according to the second embodiment of the present invention.

The vision measuring device according to the second embodiment of the present invention is the same as the first embodiment except the following point. As shown in FIG. 13, in the present embodiment, what is sent from the PC 2 to the illumination control device 152 is not a PWM frequency instruction but a brightness instruction. Also in the present embodiment, the illumination device 142 may be a PWM-controlled LED or any other illuminator.

The contrast-type auto-focusing employed by the vision measuring device according to the present embodiment can figure out the correct in-focus position by increasing image output positions. However, if the image output positions are increased, the amount of data to be sent from the camera 141 to the PC 2 is increased. In the present embodiment, because the camera 141 and the PC 2 are connected through a USB interface, the image data transfer speed is limited to approximately 400 Mbps, which increases the time taken for auto-focusing. Hence, the vision measuring device according to the present embodiment reduces the amount of data to be sent from the camera 141 to the PC 2 by sending only a partial image that is cut out from the image of the imaging range during auto-focusing, thereby raising the frame rate.

Figure 14:
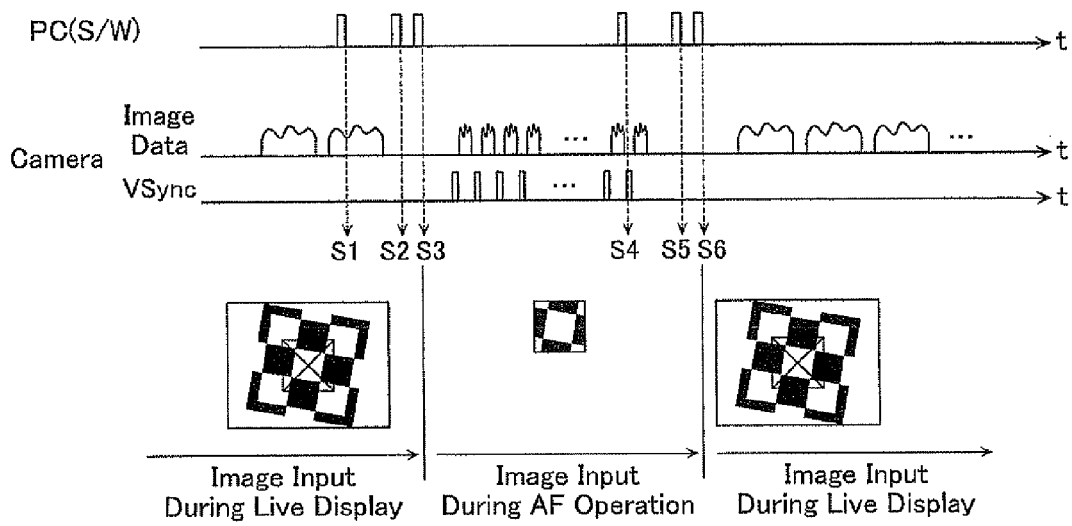
FIG. 14 is a timing chart showing an auto-focusing method of the same vision measuring device.

This auto-focusing process will be explained with reference to FIG. 14. FIG. 14 is a timing chart showing the signals exchanged between the camera 141 and the PC 2 during auto-focusing of the vision measuring device according to the present embodiment. The upper row shows some of the signals to be sent from the PC 2 to the camera 141, and the lower row shows the signals to be sent from the camera 141 to the PC 2.

In the live display state before auto-focusing is started, the image data representing the whole imaging range is sent from the camera 141 to the PC 2 as shown in the lower left of FIG. 14, for example. When an instruction to the effect that image output should be stopped is sent from the PC 2 to the camera 141 at the timing S1, image output by the camera 141 is stopped, and an instruction to the effect that the latch counter should be reset is sent from the camera 141 to the position control system 151. When the latch counter is reset, the camera 141 is driven to the auto-focusing start position.

At the timing S2, an instruction designating an image output range is sent from the PC 2 to the camera 141. In this way, the range of the image to be sent from the camera 141 to the PC 2 is restricted as shown in the picture in the lower center of FIG. 14, for example. At this time, an instruction to the effect that a vertical synchronization signal should be output may also be issued simultaneously. Then, at the timing S3, an instruction to the effect that image output should be started is sent from the PC 2 to the camera 141, and hence image data and a time stamp are output from the camera 141 to the PC 2.

When an instruction to the effect that a vertical synchronization signal should be output has been issued at the timing S2, a vertical synchronization signal is sent from the camera 141 to the position control system 151, and hence the Z-coordinate of the camera 141 when it acquired the image and the time stamp are retained in the position control system 151. When no vertical synchronization signal is used, a different way may be used to synchronize the camera 141 and the position control system 151 such as calculating the imaging timing of the camera 141 from the frame rate of the camera 141 and obtaining the Z-coordinate of the camera 141 at the calculated timing.

At the timing S4 at which auto-focusing ends, an instruction to the effect that image output should be stopped is sent from the PC 2 to the camera 141. Then, at the timing 85, a signal to the effect that the settings of the camera 141 during the auto-focusing (the designation of the image output range and output of a vertical synchronization signal) should be canceled is sent. A Z-move stop instruction, a latch stop instruction, and a latch number readout instruction are sent from the PC 2 to the position control system 151. The position control system 151 stops the camera 141 from moving, stops the operation of the latch counter and Z-value latch buffer, and sends the latch number to the PC 2. Then, a latch data readout instruction is output from the PC 2 to the position control system 151, and the data (Z-coordinate and time stamp) in the Z-value latch buffer is sent from the position control system 151 to the PC 2. The PC 2 associates the image data with the Z-coordinate based on their time stamps, and figures out the relationship between the contrast calculated from the image data and the Z-value. After this, judging that a Z-value at which the image with the highest contrast was acquired as the in-focus position, the PC 2 causes the camera 141 to be moved such that its Z-coordinate becomes the calculated in-focus position.

Finally, when an instruction to the effect that image output by live display should be resumed is output at the timing S6, the auto-focusing operation is completed, and transfer of normal image data representing the whole imaging range is resumed. At this time, the image to be sent from the camera 141 to the PC 2 has the same size as before the auto-focusing was started, as shown in the lower right of FIG. 14.

According to this method, the size of the image to be sent from the camera 141 to the PC 2 is reduced, and the frame rate of the camera 141 can be increased significantly regardless of the transfer rate of the USB interface. However, this method has to reduce the exposure time per frame, which results in reduction of the amount of light in the acquired image. Hence, the contrast and the auto-focusing accuracy become lower.

Figure 15:
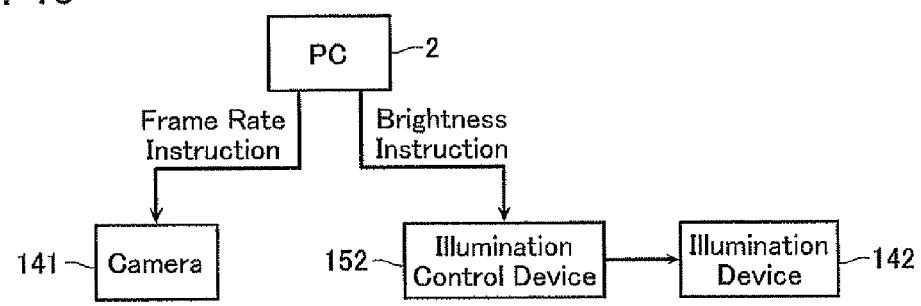
FIG. 15 is a block diagram for explaining an illumination control method of the same vision measuring device.

To solve this problem, the present embodiment turns up the light volume of the illumination device 142 during auto-focusing. This illumination control will be explained with reference to FIG. 15. FIG. 15 is a block diagram for explaining the illumination control method of the vision measuring device according to the present embodiment.

The illumination control device 152 and the camera 141 are connected in parallel to the PC 2, and the illumination device 142 is connected to the illumination control device 152. When auto-focusing is started, an instruction to the effect that image output should be stopped is output at the timing S1 of FIG. 14 the same as described above, and an instruction to the effect that image output should be started is output at the timing S3. In the present embodiment, a brightness instruction is sent from the PC 2 to the illumination control device 152 within the period from the timing S1 till the timing 33, i.e. the period from when image output from the camera 141 to the PC 2 is stopped till when image output is resumed at the designated frame rate.

By increasing the light volume of the illumination device 142 in accordance with an increase in the frame rate of the camera 141, it becomes possible to compensate for the reduction in the amount of light due to the reduction of the exposure time, and to prevent the contrast from being lowered. Hence, it becomes possible to increase the number of frames of image information to be acquired per unit time significantly while maintaining the accuracy of contrast, which enables highly accurate and high-speed auto-focusing. It is possible to realize such a configuration easily and at a low cost by software only, by diverting existing PC and vision measuring machine. It is also possible to make the PC 2 calculate the average values of brightness, contrast, etc. of the acquired images and control the illumination control device 152 based on these values.

Third Embodiment

Next, the vision measuring device according to the third embodiment of the present invention will be explained. The vision measuring device according to the present embodiment is the same as the vision measuring device according to the second embodiment except the following point. The vision measuring device according to the present embodiment controls the light volume of the illumination device 142 based on a vertical synchronization signal output from the camera 141.

Figure 16:
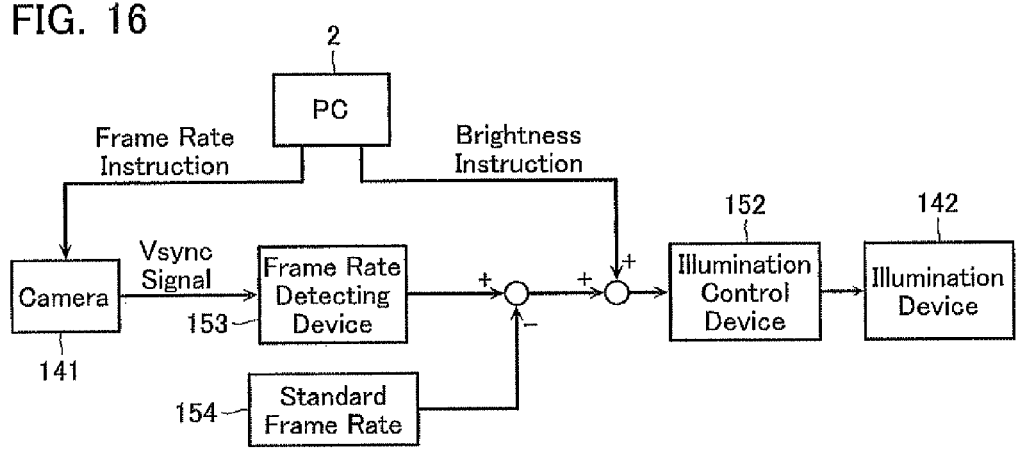
FIG. 16 is a block diagram for explaining an illumination control method of a vision measuring device according to the third embodiment of the present invention.

FIG. 16 is a block diagram for explaining an illumination control method of the vision measuring device according to the present embodiment. The vision measuring device according to the present embodiment is basically the same as the vision measuring device according to the second embodiment. However, the vision measuring device according to the present embodiment is different in that the controller 15 further includes a frame rate detecting device 153 and a standard frame rate retaining unit 154, which are connected to the camera 141 and the illumination control device 152. In the present embodiment, a vertical synchronization signal is output from the camera 141 to the frame rate detecting device 153. The frame rate detecting device 153 calculates the frame rate of the camera 141 from the vertical synchronization signal and outputs the calculated frame rate to the illumination control device 152. The difference between the calculated frame rate and a standard frame rate output by the standard frame rate retaining unit 154 is input to the illumination control device 152. At this time, an illuminance defined by the color, reflectivity, etc. of the surface of the workpiece that are output by the PC 2 may be input as a standard value to the illumination control device 152 and may further be adjusted based on the frame rate.

Figure 17:
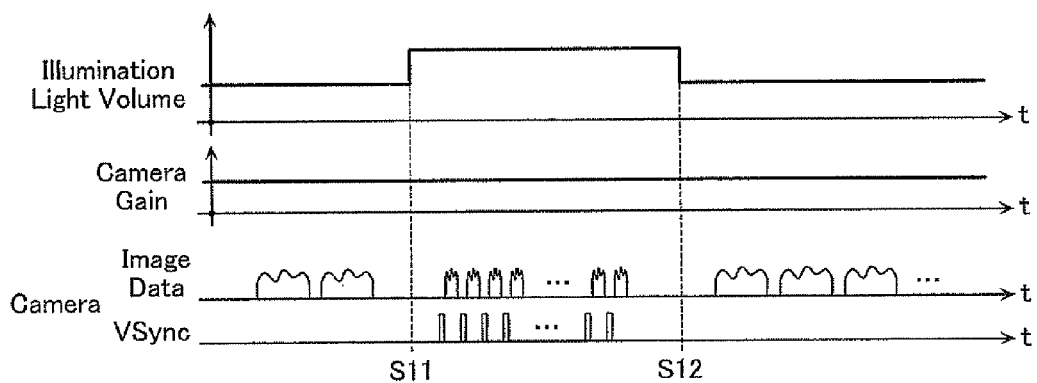
FIG. 17 is a timing chart showing an auto-focusing method of the same vision measuring device.

FIG. 17 is a timing chart showing the light volume of the illumination device 142, the gain of the camera 141, and signals to be output by the camera 141 in the vision measuring device according to the present embodiment. In this chart, the light volume of the illumination device 142 is shown in the upper row, the gain of the camera 141 is shown in the middle row, and the signals to be output by the camera 141 are shown in the lower row. In the normal measurement, the light volume of the illumination device 142 is a constant value. However, when auto-focusing is started at the timing S11, the illumination control device 142 increases the light volume of the illumination device 142 in response to a vertical synchronization signal output by the camera 141. When auto-focusing is completed at the timing S12, the illumination control device 142 returns the light volume of the illumination device 142 to the light volume in the normal measurement in response to that the camera 141 stops outputting the vertical synchronization signal. Although in the present embodiment, the vertical synchronization signal is output by the camera 141 only during auto-focusing; it may be output constantly.

In the first embodiment, the frame rate of the camera 141 and the light volume of the illumination device 142 are controlled separately by the PC 2. Therefore, there is a risk that any delay in the calculation process of the PC 2, etc. might lag the timing to give an instruction to the camera 141 and the timing to give an instruction to the illumination device 142 one behind another. Therefore, there is a possibility that a phenomenon that is not desirable for the measurement operation might occur, such as instantaneous darkening or conversely instantaneous excessive brightening of the image that is displayed on the PC 2 when the normal measurement and auto-focusing are switched. However, in the present embodiment, the frame rate of the camera 141 and the light volume of the illumination device 142 are directly synchronized by the vertical synchronization signal. Therefore, it is possible to perform imaging at an appropriate light volume at all times even when normal measurement and auto-focusing are switched, and to prevent any troubles such as fluctuation of the brightness in the screen of the PC 2, etc.

There are many cameras in the market that have a vertical synchronization signal output function, and also the frame rate detecting device 153 and the standard frame rate retaining unit 154 can be manufactured easily. Moreover, when using such one of existing controllers 15 that is mounted with a microcomputer or the like, it is possible to implement these additional circuits by means of a program such as firmware. Hence, such a configuration as described above can be realized at a very low cost.

Fourth Embodiment

Next, a vision measuring device according to the fourth embodiment of the present invention will be explained. The vision measuring device according to the present embodiment is substantially the same as the vision measuring device according to the third embodiment, but different in adjusting the gain of the camera 141 under a certain condition described later.

Figure 18:
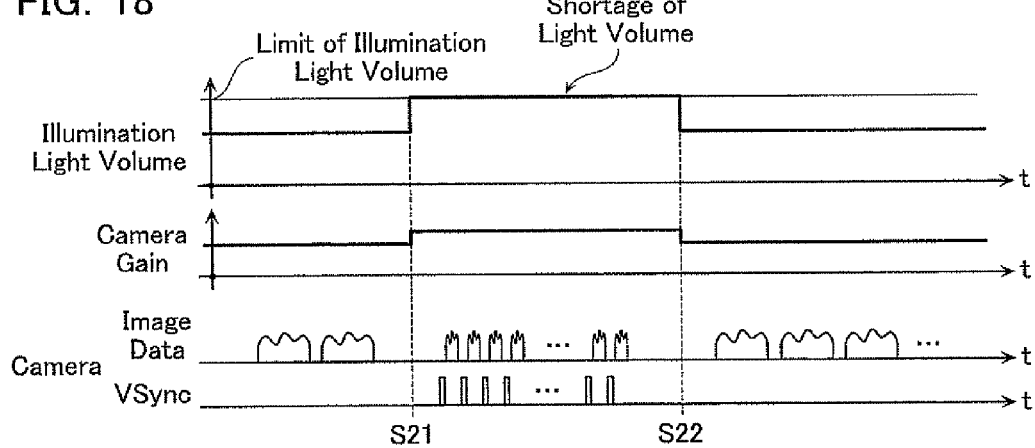
FIG. 18 is a timing chart showing an auto-focusing method of a vision measuring device according to a fourth embodiment of the present invention.

FIG. 18 is a timing chart showing the light volume of the illumination device 142, the gain of the camera 141, and the signals to be output by the camera 141 in the auto-focusing of the vision measuring device according to the present embodiment. FIG. 18 is basically the same as FIG. 17, but different in that during auto-focusing, the light volume of the illumination device 142 is increased to the maximum output and the gain of the camera 141 is increased.

The vision measuring device according to the present embodiment increases the light volume of the illumination device 142 during auto-focusing. However, in such a case, there is a possibility that a light volume higher than the maximum output of the illumination device 142 might be required. The present embodiment compensates for any shortage in the light volume of the illumination device 142 by increasing the gain of the camera 141. Such a configuration can realize highly accurate and high-speed auto-focusing with excellent operability even when the light volume of the illumination device 142 is insufficient.

What is claimed is:

1. A vision measuring device, comprising:
an imaging device which images a workpiece;
an illumination device which irradiates the workpiece with light;
a position control system which controls an in-focus position of the imaging device and outputs the in-focus position as information representing a position in an in-focus axis direction; and
a control device which, when the position control system controls the in-focus position, controls a frame rate of the imaging device, and also controls at least one of the imaging device and the illumination device such that an amount of light to be received by the imaging device becomes substantially constant.

2. The vision measuring device according to claim 1,
wherein the control device controls at least one of the imaging device and the illumination device in response to a signal from the imaging device.

3. A vision measuring device, comprising:
an imaging device which imaging a workpiece, and of which exposure time is variable;
an illumination device which is controlled to emit light at a certain emission frequency and irradiate the workpiece with illumination light;
a position control system which controls an in-focus position of the imaging device and outputs the in-focus position as information representing a position in an in-focus axis direction; and
a control device which, when the position control system controls the in-focus position, sets the exposure time of the imaging device to an integral multiple of a lighting period of an interior lamp based on which of a first frequency and a second frequency a lighting frequency of the interior lamp is,
wherein the emission frequency of the illumination device is set to a common multiple of the first frequency and the second frequency.

4. The vision measuring device according to claim 3,
wherein the control device detects the lighting frequency of the interior lamp when the illumination device is turned off.

5. The vision measuring device according to claim 4,
wherein the control device controls the position control system both in a case when the exposure time of the imaging device is set to an integral multiple of a lighting period corresponding to the first frequency and a case when the exposure time of the imaging device is set to an integral multiple of a lighting period corresponding to the second frequency, such that the imaging device performs imaging at a plurality of different in-focus positions corresponding to these cases,
the control device calculates a fluctuation rate of average brightness of acquired images, and
the control device sets the exposure time of the imaging device to an integral multiple of the lighting period corresponding to either the first frequency or the second frequency that corresponds to a lower fluctuation rate of average brightness.

6. The vision measuring device according to claim 5,
wherein the first frequency is 100 Hz, and the second frequency is 120 Hz.

7. The vision measuring device according to claim 6,
wherein the emission frequency of the illumination device is an integral multiple of 600 Hz.

8. The vision measuring device according to claim 3, wherein the control device changes the in-focus position of the imaging device after three or more images of the workpiece are acquired.

9. The vision measuring device according to claim 3, wherein the illumination device receives a vertical synchronization signal from the imaging device, and outputs a certain number of pulses within the exposure time of the imaging device.

10. The vision measuring device according to claim 3, wherein the control device sets a long exposure time when the workpiece is irradiated with external diffused light other than the interior lamp.

11. A vision measuring device, comprising:
an imaging device which images a workpiece, and of which frame rate is variable;
an illumination device which irradiates the workpiece with light;
a position control system which controls an in-focus position of the imaging device and outputs the in-focus position as information representing a position in an in-focus axis direction; and
a control device which, when the position control system controls the in-focus position, controls the frame rate of the imaging device and adjusts a light volume of the illumination device in accordance with the frame rate of the imaging device.

12. The vision measuring device according to claim 11, wherein when controlling the in-focus position of the imaging device, the control device receives a portion of an image of an imaging range of the imaging device, increases the frame rate of the imaging device, and increases the light volume of the illumination device.

13. The vision measuring device according to claim 11, wherein the control device adjusts the light volume of the illumination device in response to a vertical synchronization signal output by the imaging device.

14. The vision measuring device according to claim 13, wherein when controlling the in-focus position of the imaging device, the control device adjusts the light volume of the illumination device in accordance with a first frame rate calculated from an interval of the vertical synchronization signal output by the imaging device and a second frame rate used in a normal measurement.

15. The vision measuring device according to claim 10, wherein the control device adjusts a gain of the imaging device in accordance with the frame rate of the imaging device.

16. The vision measuring device according to claim 11, wherein the control device obtains the in-focus position in response to the vertical synchronization signal.

17. The vision measuring device according to claim 11, wherein the control device adjusts the light volume of the illumination device by using illuminance defined by a color, a reflectivity, etc. of a surface of the workpiece.

18. The vision measuring device according to claim 11, further comprising:
a frame rate detecting device which detects the frame rate of the imaging device; and
a standard frame rate retaining unit which retains the frame rate of the imaging device during vision measurement.

19. The vision measuring device according to claim 18, wherein the frame rate detecting device and the frame rate retaining unit are implemented by a program such as firmware.

20. The vision measuring device according to claim 15, wherein the control device adjusts the gain of the imaging device when an output of the illumination device exceeds a certain value.

* * * * *